United States Patent [19]

Sadeck et al.

[11] Patent Number: 5,618,011

[45] Date of Patent: Apr. 8, 1997

[54] LOAD SECURING AND RELEASING SYSTEM

[75] Inventors: James E. Sadeck, East Freetown; Gary F. Vincens, Norton, both of Mass.; Donald Billoni, Waverly, Va.

[73] Assignee: The United States of America as represented by the Secretary of the Army, Washington, D.C.

[21] Appl. No.: 585,066

[22] Filed: Jan. 11, 1996

[51] Int. Cl.⁶ .................................................. B64D 17/30
[52] U.S. Cl. .................... 244/151 B; 244/152; 24/573.6
[58] Field of Search ................................... 244/148, 149, 244/151 B, 137.3, 152, 137.1; 24/573.6, 573.3, 537.7

[56] References Cited

U.S. PATENT DOCUMENTS

| | | | |
|---|---|---|---|
| 3,380,692 | 4/1968 | Gaylord | 244/151 B |
| 3,779,489 | 12/1973 | Matsuo | 244/152 |
| 3,781,055 | 12/1973 | Keich et al. | 294/83 A |
| 3,840,988 | 10/1974 | Hoffman | 244/151 B |
| 4,262,865 | 4/1981 | Smith | 244/151 B |
| 4,279,393 | 7/1981 | Spinks | 244/152 |
| 4,337,913 | 7/1982 | Booth | 244/151 B |
| 4,428,102 | 1/1984 | Brownell | 244/151 B |
| 4,562,623 | 1/1986 | Jeswine | 244/151 B |
| 4,923,150 | 5/1990 | Calkins et al. | 244/151 B |
| 5,284,310 | 2/1994 | Conway, Jr. | 244/151 B |

*Primary Examiner*—Andres Kashnikow
*Assistant Examiner*—Tien Dinh
*Attorney, Agent, or Firm*—Vincent J. Ranucci; Earl Reichert

[57] ABSTRACT

A load securing and releasing system for releasably attaching two objects together, one of the objects preferably being a parachute. The secure and release system having a main load carrying component with a first end portion and a second end portion, a secure/release mechanism for securing the end portions together and for releasing the end portions. The secure/release mechanism being made up of plurality of interlocking members which provide a substantial mechanical advantage to the system. The system further includes a closure member for securing the interlocking members together. A detachment component is operably connected to the closure member for detaching the closure member from the interlocking members. By proper interrelationship of the interconnecting members the objects are secured together until such time when the detachment component is activated and the objects are thereby released.

12 Claims, 3 Drawing Sheets

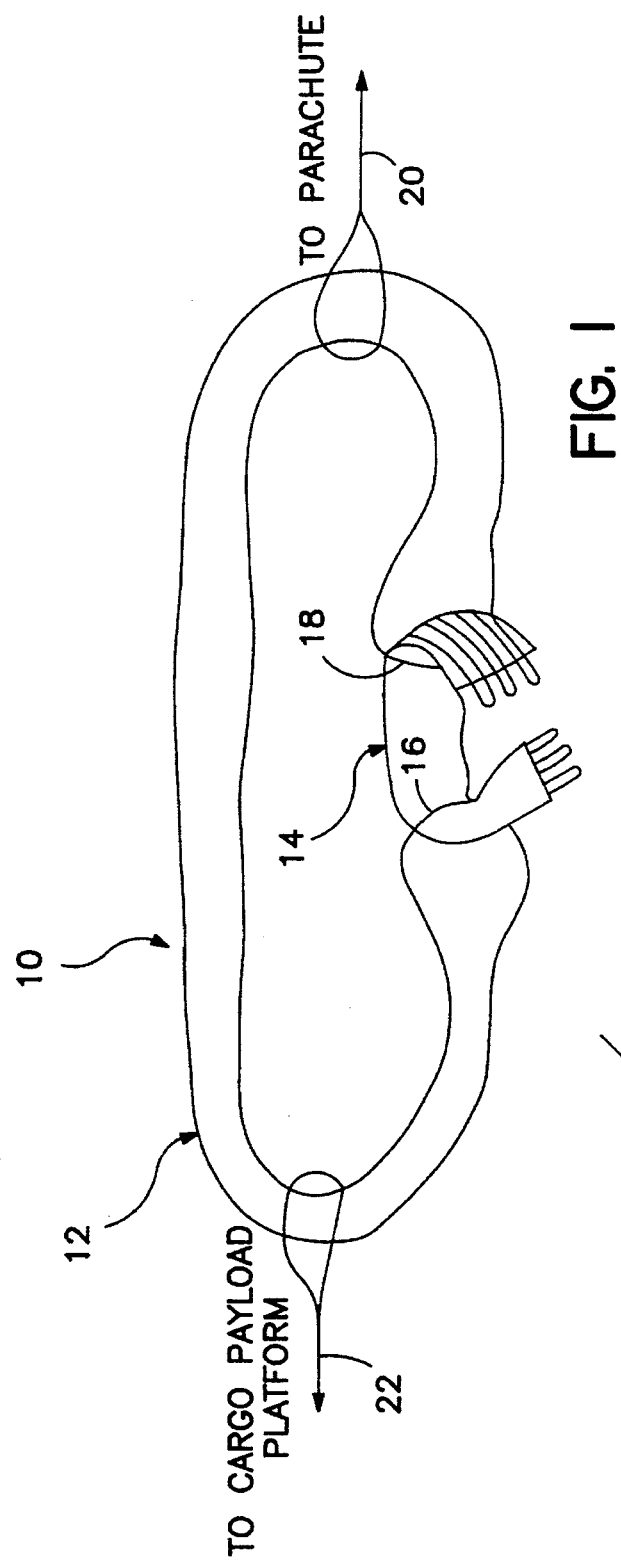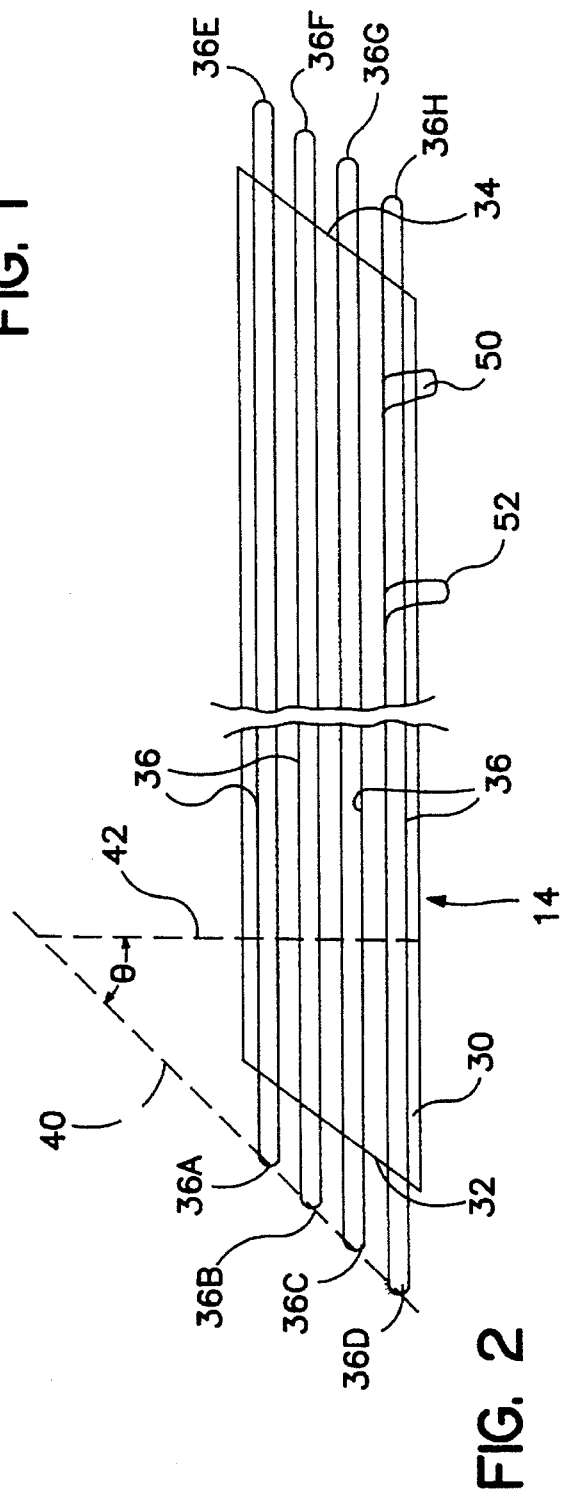

LOAD SECURING AND RELEASING SYSTEM

STATEMENT OF GOVERNMENT INTEREST

The invention described herein maybe manufactured and used by and for the Government for governmental purposes without the payment of any royalties thereon.

FIELD OF THE INVENTION

The present invention relates generally to load release devices and, more particularly to a light weight, high strength and easily constructed system for securing and controllably releasing a load to an object and which is particularly effective in the release of large extraction parachute systems and large main recovery parachutes used in the extraction of payloads from aircraft.

BACKGROUND OF THE INVENTION

There are many instances when an object or load must be securely attached to another object and then, at a preselected time, be able to be quickly and reliably released. One area of particular concern involves the quick release of a parachute. For example, in the air drop of equipment from aircraft, it is necessary to provide means for securing a parachute to a load or cargo for the extraction of cargo from the aircraft and for safely lowering the cargo to the ground. This function is usually performed by a large extraction parachute system or by an extraction parachute and a recovery parachute.

Generally, an extraction parachute or parachute system is utilized to withdraw the cargo from an aircraft. The drag force created by the inflation of the extraction parachute deployed behind the aircraft is utilized to extract the cargo and a recovery parachute is utilized to lower the load from the aircraft to the earth's surface. In the alternative, the extraction parachute alone can be utilized to both extract the load from the aircraft as well as lower the load to the earth's surface.

In virtually all circumstances when an extraction parachute is used in conjunction with a recovery parachute, as soon as the extracted cargo is sufficiently clear of the aircraft, to avoid entanglement with the recovery parachute, the extraction parachute must be released from the cargo. As this occurs, the force exerted by the extraction parachute is transferred to the recovery parachute which assists in the "gentle" lowering of the cargo to the ground. The recovery parachute reduces the rate of fall of the cargo to the point where energy absorbing materials placed under and around the cargo will adequately protect it from damage caused by impact with the ground.

Serious problems can occur when the above mentioned procedures malfunction and (1) the load or cargo is not extracted from the aircraft even though the extraction parachute has been deployed properly, (2) the load or cargo fails to exit the aircraft, or (3) the extraction parachute does not properly deploy or inflate. In any of the above situations, the load master or individual in charge of overseeing the cargo drop must attempt to release the extraction parachute from the aircraft.

Present devices utilized for securing and releasing an extraction parachute (or other such load) have many problems associated therewith. For example, the most common way in which such parachutes are released from an aircraft, either because the parachute has deployed but the cargo has not released or because the parachute has failed to deploy, is a manual cutting of the lines by the load master upon observation of this occurrence. This type of operation endangers the load master who is positioned between the extraction parachute and the payload or cargo when the cutting operation needs to be performed.

Furthermore, present release mechanisms which are utilized to assist in ground impact after the cargo has been deployed are generally large metallic mechanisms which are expensive to manufacture and, in many instances, unreliable in operation. These releases are extremely heavy and cumbersome and in most circumstances different then the releases utilized for releasing a parachute from the aircraft. The heavy weight of the metallic release mechanism may also damage the payload by falling on it after the recovery parachute has been released.

It is therefore an object of this invention to provide a light weight, high strength and economically manufactured secure and release system for use with a wide variety and types of loads.

It is another object of this invention to provide a secure and release system for the extraction of parachutes which is manufactured of synthetic webbing and braided cord material.

It is still a further object of this invention to provide a secure and release system which can function as an emergency extraction parachute release mechanism and/or a ground impact parachute release mechanism.

It is even a further object of this invention to provide a secure and release system which is constructed without metal parts.

An even further object of this invention is to provide a secure and release system which is extremely inexpensive to manufacture.

SUMMARY OF THE INVENTION

The present invention overcomes the problems associated with past mechanisms used to secure and selectively release objects by providing a secure and release system which is not only light weight and easily manufactured, but is of extremely high strength and can be readily utilized in conjunction with a variety of loads and objects including both an extraction parachute and a recovery parachute.

The load securing and releasing system of the present invention is made up of main load carrying elements which incorporate therein multi-layers of high strength webbing material forming a continuous loop in concentric configuration. The ends of the loop have a secure/release mechanism which passes therethrough. The secure/release mechanism is constructed of continuous loops of high strength braided cord stitched to a webbing. These continuous loops are stitched to the webbing in such a manner as to form a steep angle between a line drawn through their ends and a line normal to the center line axis of the webbing. When the secure/release mechanism is closed or locked by interlocking opposed ends of the continuous loops in proper sequence, the locking of the loops creates a securing condition of substantial mechanical advantage. Selective release takes place in a manner described below.

A closure/sacrifice device, in the form, for example, a singular braided loop locks the series of continuous loops by passing through a multiplier loop and then through an anchor loop, both affixed to the webbing. Severing of the closure/sacrifice device or loop allows the secure/release mechanism to open and slide through the loops of the secure/release mechanism releasing any payload or cargo supported by the carrying elements.

Severing the closure/sacrifice loop will activate the release process. This can be accomplished through the use of a zero time mechanical or electrical pyrotechnic device, which will function at a preselected time or occurrence. When the object or load used with the secure and release system of this invention is a parachute, the aircraft load master determines when an emergency has occurred. When a switch on the payload initiates release, release will occur upon ground impact of the cargo.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 1 is a schematic, pictorial illustration of the secure and release system of this invention;

FIG. 2 is a schematic, pictorial illustration of the secure/release mechanism of the secure and release system of this invention;

DETAILED DESCRIPTION OF THE PREFERRED EMBODIMENTS

Figure 3:
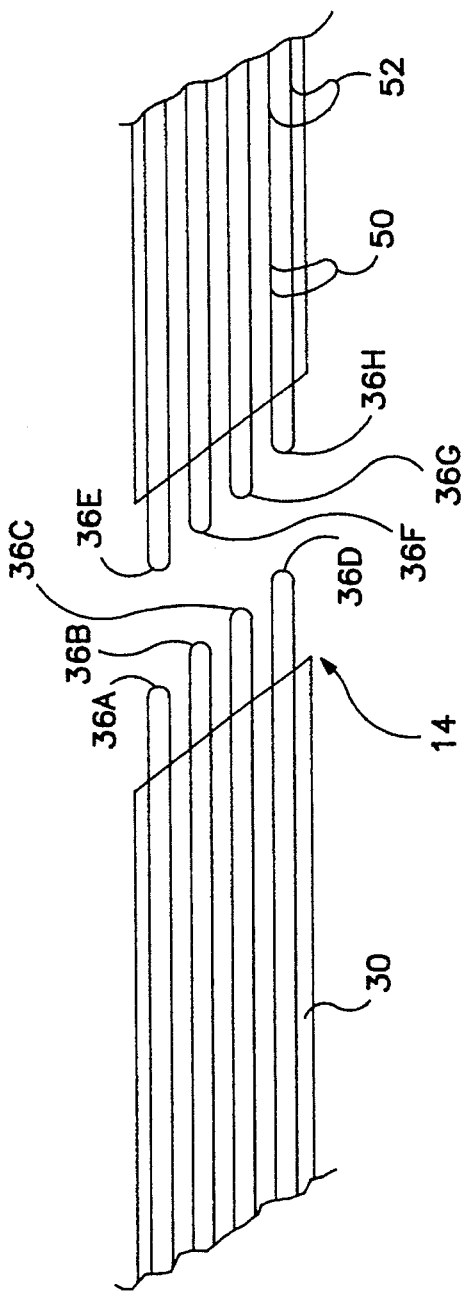
FIG. 3 is a schematic, pictorial illustration of the secure/release mechanism of the secure and release system of this invention showing the loops juxtaposed one another prior to interconnection.

Reference is now made to FIG. 1 of the drawings which in schematic, pictorial fashion illustrates the load securing and releasing system 10 of the present invention. The secure and release system 10 is made up of two major components, a main load carrying component or loop 12 and a secure/release mechanism 14. The main load carrying component 12 is constructed of a continuous loop of multi-layered high strength webbing material formed in a concentric configuration having a first end 16 and a second end 18. Passing through the ends 16 and 18 thereof is the secure/release mechanism 14, the operation of which will be described in greater detail here and below.

Also shown in FIG. 1 of the drawings are arrows indicating the interconnection of a pair of objects. Any objects or loads can be releasably interconnected by this invention, with this invention is preferably used with a parachute attached to the load carrying loop 12 at 20 and the cargo payload platform attached at 22. Although this invention is preferably used to selectively release a parachute system or extraction or recovery parachute it should be realized that the particular secure and release system 10 of this invention is capable of securely holding together any two objects which need to be released at a preselected instance.

Figure 4:
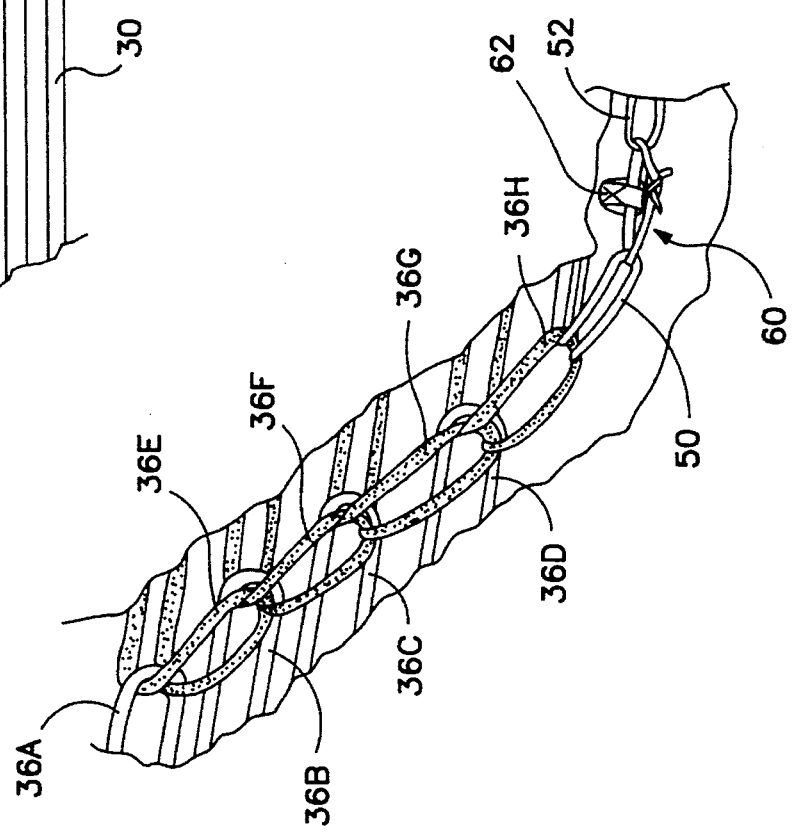
FIG. 4 is a pictorial illustration of a series of the interlocking loops of the secure/release mechanism shown in FIGS. 2 and 3.

Reference is now made to FIG. 2 of the drawings which more clearly and schematically illustrate the secure/release mechanism 14 of the present invention. The secure/release mechanism 14 is made up of a webbing material 30 running along a longitudinal axis and having a first end 32 and a second end 34. A plurality of continuous loops of high strength braided cords 36 having first ends 36 A, B, C, and D and second ends 36 E, F, G, and H are interconnected together in a manner described hereinbelow. FIGS. 3 and 4 of the drawings clearly illustrate the manner in which loops 36 are held together.

Loops 36 are stitched to webbing 30 in such a manner as to form a steep angle θ between a line 40 drawn through their ends and a line 42 normal or perpendicular to the longitudinal axis of webbing 30 as shown in FIG. 2 of the drawings. When loops 36 are closed by interconnecting or interlocking the loops 36 together in a proper sequence as will be described below, a substantial mechanical advantage can be achieved for securing objects together. Although FIG. 2 of the drawings illustrate four such release/attachment loops 36 any number of such loops can be utilized with the present invention. The more such loops that are utilized the greater the mechanical advantage. The mechanical advantage for a system containing the four loops 36 as shown in FIG. 2 would be 68 to 1. The mechanical advantage can be increased by increasing the number of braided cord loops 36 or by the addition of a secondary multiplier loop or the use of an additional load carrying loop as described below below. The multiplier loop 50 and the anchor loop 52 are also attached to webbing 30 by stitching. The significance of these loops will be explained below with respect to FIGS. 3 and 4 of the drawings.

As shown in FIG. 3 of the drawings the secure/release mechanism 14 is illustrated "turned over upon itself" such that opposite ends of loops 36 (that is ends 36A, B, C and D are now positioned opposite ends 36 E, F, G, and H. In this position, multiplier loop 50 is now closer to the ends 36A–D then anchor loop 52.

The exact interconnection of the loops 36 is illustrated in FIG. 4 of the drawings in which the loops 36 having ends 36E–H are depicted shaded and ends 36A–D are not shaded in order to clearly illustrate the interconnection and relationship of the loops 36. This shading is only provided for the purposes of clarity in order to undestand the actual interconnection of the loops 36.

More specifically, the interconnection takes palce as follows: loop 36E is dram through loop 36A and is positioned adjacent the end of loop 36B. Loop 36F is then dram through both loops 36E and 36B such that it is now positioned adjacent end loop 36C. The next step requires the passing through of loop 36G through both loops 36F and 36C such that it ends up adjacent the loop 36D. Thereafter, loop 36H pases through loop 36G and 36D.

At this point the multiplier loop 50 passes through loop 36H and is now positioned in a space apart relationship with the anchor loop 52. A closure device 60 in the form of a closure/sacrifice loop secures the anchor loop 52 and the multiplier loop 50 together. A detachment mechanism 62, which may be in the form of a pyrotechnic cutter, can be activated at a preselected time to detach or sever closure device 60. The detachment mechanism 62 can be in the form of any conventional zero time mechanical or electrical pyrotechnic device which will function when the aircraft load master determines that an emergency exists and therefore the release of a parachute, for example, is necessary. This action releases all of the other loops. Consequently, the secured objects such as a parachute from an aircraft are released in a very rapid and predetermined fashion.

The utilization of a plurality of loops 36 creates a tremendous mechanical advantage such that the forces acting upon the entire system are substantially reduced. Braided cords having a tensile strength of approximately 4,000 pounds stitched to a webbing made of nylon or dacron, which acts as a support or buffer, permits the secure and release system of the present invention to securely attach together a tremendous amount of weight for selective release.

Figure 5:
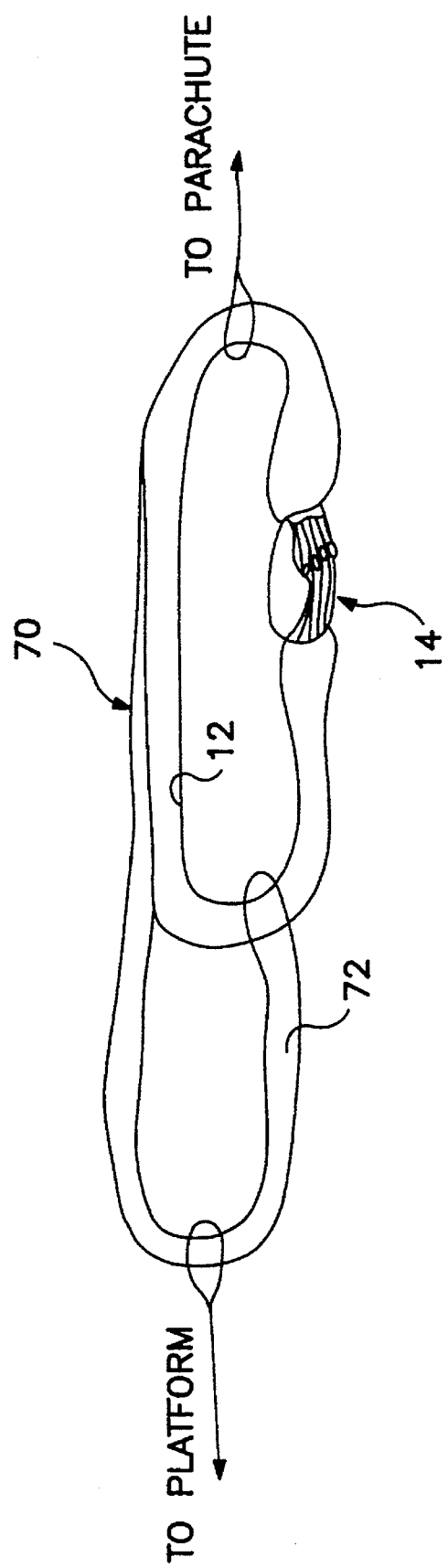
FIG. 5 is a schematic, pictorial illustration of another embodiment of the secure and release system of this invention having an additional secondary multiplier loop.

A substantial mechanical advantage can occur by increasing either the number of braided cord loops 36 or by the addition of a secondary multiplier loop 50 or as illustrated in FIG. 5 of the drawings by the utilization of an additional load carrying member 72 as depicted with the secure and release system 70 as illustrated therein.

Although the invention has been described with reference to particular embodiments, it will be understood that this invention is also capable of further and other embodiments within the spirit and scope of the appended claims.

What is claimed is:

1. A secure and release system for releasably attaching two objects together, said secure and release system comprising:

a main load carrying component having a first end portion and a second end portion;

a secure/release means for securing said end portions together and for releasing said end portions;

said secure/release means being capable of releasing said end portions at a preselected instance;

said secure/release means having a plurality of interlocking members which provide a substantial mechanical advantage to the system, closure means for securing said interlocking members together, and means operably connected to said closure means for detaching said closure means from said interlocking members;

said secure/release means comprising a high strength webbing material having a first end and a second end, and said plurality of interlocking members being affixed to said webbing material along the longitudinal axis thereof;

said plurality of interlocking members comprising a plurality of longitudinally extending loops of braided cord, each of said braided cord loops having a first end and a second end, wherein the ends of each of said braided cord loops extend beyond the ends of said webbing material, and wherein a line drawn through the ends of each of said braided cord loops forms a steep angle with respect to a line drawn perpendicular to the longitudinal axis of said webbing material;

whereby said secure and release system, upon activation of said detaching means, releases said objects from each other.

2. A secure and release system as defined in claim 1 wherein said webbing material has a pair of additional loops affixed thereto, one of said additional pair of loops being capable of interconnecting with a said end of a said braided cord loop; and said closure means being attachable between said pair of additional loops.

3. A secure and release system as defined in claim 2 wherein said detaching means comprises a device capable of releasing said closure means at a preselected instance.

4. A secure and release system as defined in claim 3 wherein said main load carrying component comprises a least one continuous loop of webbing material.

5. A secure and release system as defined in claim 3 wherein said interlocking members are affixed to said webbing material by being stitched thereto.

6. A secure and release system as defined in claim 3 wherein said detaching means comprises a zero time pyrotechnic device.

7. A secure and release system as defined in claim 3 wherein there are at least four longitudinally extending loops of braided cord, thereby providing said secure and release system with a mechanical advantage of approximately sixty-eight to one.

8. A secure and release system as defined in claim 3 wherein in the secure position the second ends of said braided cord loops intertwine in sequence with the first end of said braided cord loops in such a manner that the last intertwined second end attaches with one of said additional one of said loops, and said one additional one of said loops is attached to said other additional loop by said closure means.

9. A secure and release mechanism capable of releasing objects at a preselected instance comprising:

a high strength webbing material of predetermined width and having a first end and a second end;

a plurality of interlocking members; said plurality of interlocking members being affixed to said webbing material along the longitudinal axis thereof;

closure means for securing said interlocking members together;

means operably connected to said closure means for detaching said closure means from said interlocking members at said preselected instance; and wherein said plurality of interlocking members comprise a plurality of longitudinally extending loops of braided cord, each of said braided cord loops having a first end and a second end, wherein the ends of each of said braided cord loops extend beyond the ends of said webbing material.

10. A secure and release mechanism as defined in claim 9 wherein a line drawn through the ends of each of said braided cord loops form a steep angle with respect to a line drawn perpendicular to the longitudinal axis of said webbing.

11. A secure and release mechanism as defined in claim 10 wherein said webbing material has a pair of additional loops affixed thereto, one of said additional pair of loops being capable of interconnecting with a said end of a said braided cord loop; and said closure means being attachable between said pair of additional loops.

12. A secure and release mechanism as defined in claim 11 wherein said interlocking members are affixed to said webbing material by being stitched thereto.

* * * * *